US009848576B2

(12) United States Patent
Krone et al.

(10) Patent No.: US 9,848,576 B2
(45) Date of Patent: Dec. 26, 2017

(54) MILKING CLUSTER AND MILKING PARLOR HAVING SUCH A MILKING CLUSTER

(71) Applicant: GEA Farm Technologies GmbH, Bönen (DE)

(72) Inventors: Otto Krone, Laggenbeck (DE); Markus Auburger, Lippstadt (DE)

(73) Assignee: GEA Farm Technologies GmbH, Bönen (DE)

( * ) Notice: Subject to any disclaimer, the term of this patent is extended or adjusted under 35 U.S.C. 154(b) by 0 days.

(21) Appl. No.: 15/247,544

(22) Filed: Aug. 25, 2016

(65) Prior Publication Data

US 2017/0042110 A1    Feb. 16, 2017

Related U.S. Application Data

(63) Continuation of application No. 14/002,076, filed as application No. PCT/EP2012/054645 on Mar. 16, 2012, now Pat. No. 9,426,966.

(30) Foreign Application Priority Data

Mar. 18, 2011    (DE) ........................ 10 2011 001 404

(51) Int. Cl.
| | | |
|---|---|---|
| *A01J 3/00* | (2006.01) | |
| *A01J 5/02* | (2006.01) | |
| *A01J 5/017* | (2006.01) | |
| *A01K 1/12* | (2006.01) | |

(52) U.S. Cl.
CPC ................ *A01J 5/02* (2013.01); *A01J 5/017* (2013.01); *A01J 5/0175* (2013.01); *A01K 1/12* (2013.01)

(58) Field of Classification Search
CPC ....................................................... A01J 5/017
See application file for complete search history.

(56) References Cited

U.S. PATENT DOCUMENTS

| | | | |
|---|---|---|---|
| 2,357,373 A | | 9/1944 | Anderson |
| 3,861,355 A | * | 1/1975 | Johnson ................. A01J 5/017 119/14.08 |
| 3,870,021 A | | 3/1975 | Nederbragt |
| 4,508,058 A | | 4/1985 | Jakobson et al. |
| 4,838,207 A | | 6/1989 | Bom et al. |
| 5,042,428 A | | 8/1991 | Van Der Lely et al. |

(Continued)

FOREIGN PATENT DOCUMENTS

| | | |
|---|---|---|
| DE | 29522237 | 1/2001 |
| DE | 102006027919 | 12/2003 |

(Continued)

OTHER PUBLICATIONS

International Search Report and Written Opinion dated Mar. 14, 2013, PCT Application No. PCT/EP2013/055270, 13 pages.

(Continued)

*Primary Examiner* — Kristen C Hayes
(74) *Attorney, Agent, or Firm* — Smith Law Office; Jeffry W. Smith

(57) ABSTRACT

A milking cluster for a milking parlor for milking milk-giving animals, having at least one teat cup unit having a housing, a teat cup, a drive appliance, a pulling element arrangement connected to the teat cup, and the pulling element arrangement has a segment unit having at least two pulling elements.

23 Claims, 17 Drawing Sheets

(56) References Cited

U.S. PATENT DOCUMENTS

| | | |
|---|---|---|
| 5,056,466 A | 10/1991 | Dessing et al. |
| 5,383,423 A | 1/1995 | Van Der Lely |
| 5,586,518 A | 12/1996 | Carrano |
| 5,595,945 A | 1/1997 | Wicks |
| 5,596,945 A | 1/1997 | van der Lely |
| 5,606,932 A | 3/1997 | van der Lely |
| 5,678,506 A | 10/1997 | van der Berg et al. |
| 5,697,324 A | 12/1997 | van der Lely |
| 5,718,186 A | 2/1998 | van der Lely |
| 5,784,994 A | 7/1998 | van der Lely |
| 5,862,776 A | 1/1999 | van den Berg |
| 5,918,566 A | 7/1999 | van den Berg |
| 5,979,359 A | 11/1999 | Hansson |
| 6,044,793 A | 4/2000 | van der Lely |
| 6,050,219 A | 4/2000 | van der Lely |
| 6,116,188 A | 9/2000 | van der Lely |
| 6,148,766 A | 11/2000 | van der Lely |
| 6,213,051 B1 | 4/2001 | Fransen |
| 6,244,215 B1 | 6/2001 | Oosterling |
| 6,279,507 B1 | 8/2001 | van der Lely et al. |
| 6,363,883 B1 | 4/2002 | Birk |
| 6,382,130 B1 | 5/2002 | Rooney |
| 6,386,141 B1 | 5/2002 | Forsen et al. |
| 6,584,929 B2 | 7/2003 | van der Lely et al. |
| 6,814,027 B2 | 11/2004 | Hein et al. |
| 7,104,218 B2 | 9/2006 | Teckentrup et al. |
| 8,015,941 B2 | 9/2011 | Hallstroem |
| 8,281,746 B2 | 10/2012 | Nilsson et al. |
| 8,286,583 B2 | 10/2012 | Van Den Berg |
| 8,646,412 B2 | 2/2014 | Eriksson |
| 9,107,378 B2 | 8/2015 | Hofman et al. |
| 9,161,512 B2 | 10/2015 | Hofman et al. |
| 9,215,858 B2 | 12/2015 | Johannesson et al. |
| 9,426,966 B2 * | 8/2016 | Krone ................... A01J 5/0175 |
| 9,491,924 B2 | 11/2016 | Hofman et al. |
| 9,549,530 B2 | 1/2017 | Harty, Sr. et al. |
| 2007/0277737 A1 * | 12/2007 | Maier ..................... A01J 5/007 119/14.45 |
| 2010/0186676 A1 * | 7/2010 | Van Der Berg ........ A01J 5/003 119/14.08 |
| 2010/0326361 A1 * | 12/2010 | Van Den Berg .......... A01J 5/08 119/14.47 |
| 2014/0060436 A1 * | 3/2014 | Krone ..................... A01J 5/017 119/14.1 |
| 2015/0020738 A1 | 1/2015 | Krone et al. |
| 2015/0020739 A1 | 1/2015 | Krone et al. |
| 2015/0059649 A1 | 3/2015 | Van Der Sluis et al. |
| 2015/0296737 A1 | 10/2015 | Krone et al. |

FOREIGN PATENT DOCUMENTS

| | | |
|---|---|---|
| EP | 0647390 | 6/1995 |
| EP | 0647391 | 6/1995 |
| EP | 0657097 | 9/1995 |
| EP | 0736246 | 10/1996 |
| EP | 0734649 | 3/1997 |
| EP | 0811319 | 12/1997 |
| EP | 0862360 | 3/2003 |
| EP | 0551960 | 9/2006 |
| GB | 1383038 | 2/1975 |
| RU | 2244417 | 1/2005 |
| RU | 2279796 | 7/2006 |
| WO | 93/13651 | 7/1993 |
| WO | 96/01041 | 1/1996 |
| WO | 96/17314 | 3/1996 |
| WO | 98/46069 | 10/1998 |
| WO | 00/13492 | 3/2000 |
| WO | 01/67852 | 9/2001 |
| WO | 02/15676 | 2/2002 |
| WO | 2008/118068 | 10/2008 |
| WO | 2010/052156 | 5/2010 |
| WO | 2011/098454 | 8/2011 |
| WO | 2011/098994 | 8/2011 |

OTHER PUBLICATIONS

International Search Report and Written Opiniion dated Mar. 14, 2013, PCT Application No. PCT/EP2013/055272, 9 pages.
International Search Report and Written Opinion dated Mar. 27, 2013, PCT Application No. PCT/EP2013/055265, 7 pages.
International Search Report and Written Opinion dated May 24, 2013, PCT Application No. PCT/EP2013/055288, 9 pages.
International Preliminary Report on Patentability and Written Opinion, PCT/EP2011/054163, English translation dated Sep. 24, 2013, 6 pages.
German Search Report dated Feb. 17, 2012 from German Patent Application No. 102011001404.7, 6 pages.
International Preliminary Report on Patentability and Written Opinion for PCT/EP2012/054645, English translation dated Sep. 24, 2013, 6 pages.

* cited by examiner

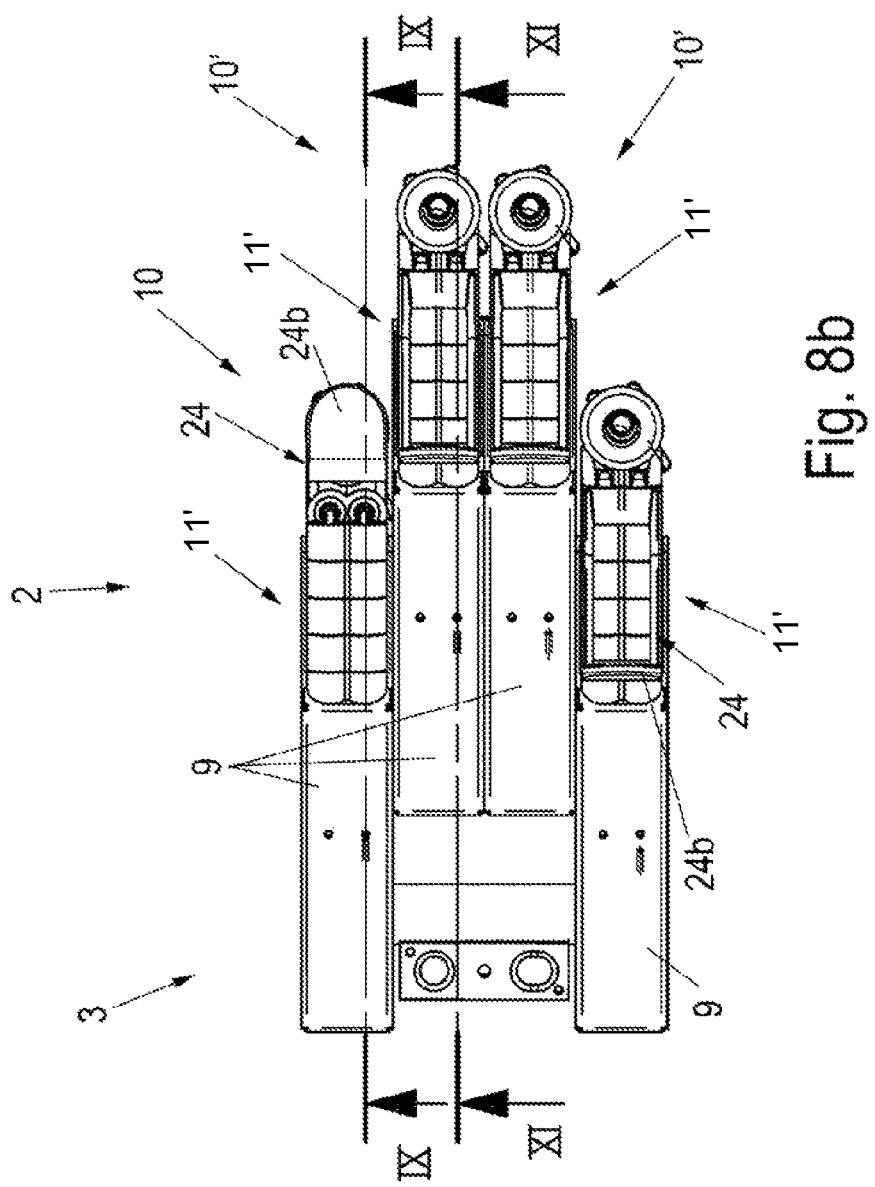

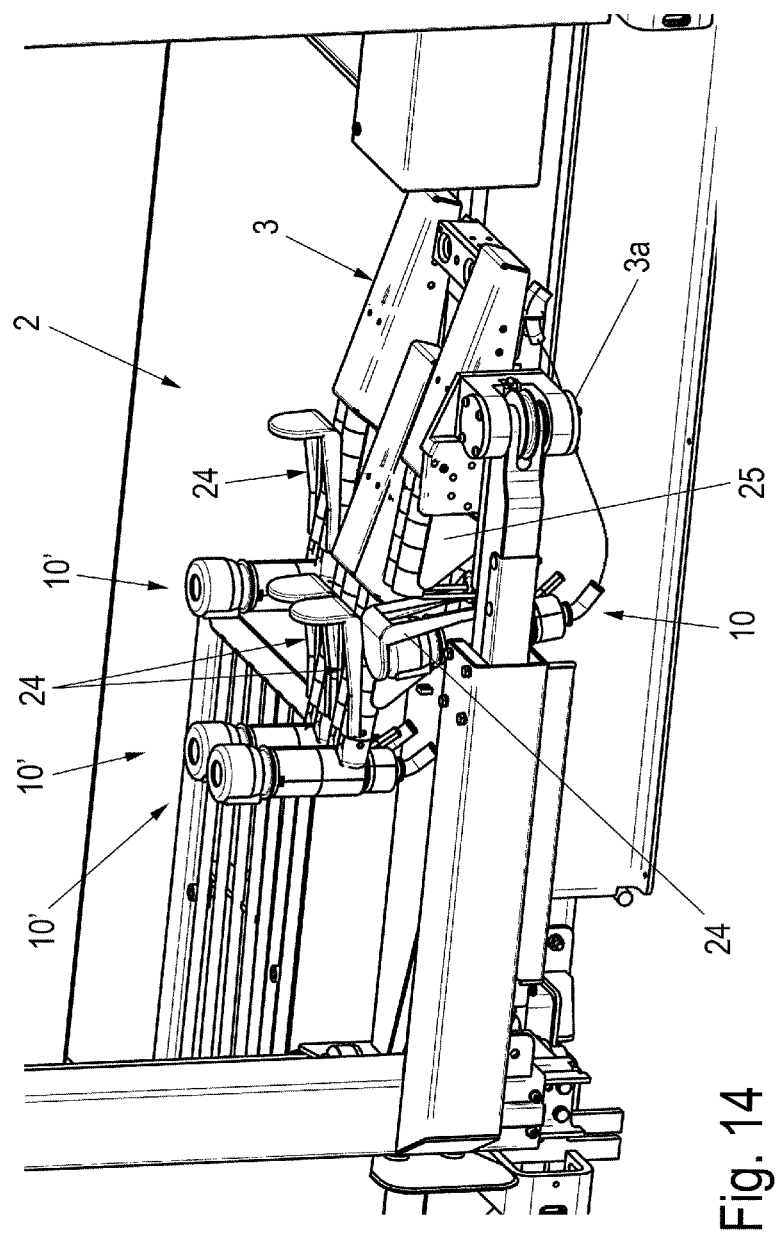

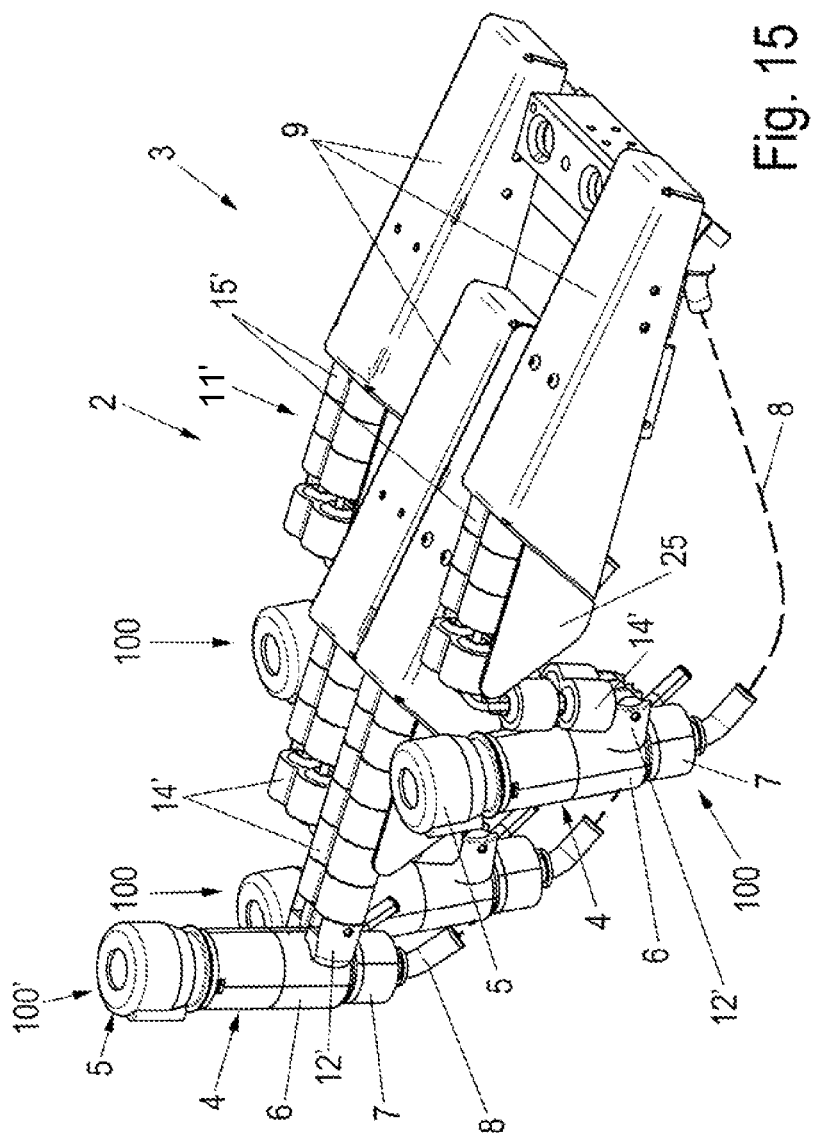

MILKING CLUSTER AND MILKING PARLOR HAVING SUCH A MILKING CLUSTER

CROSS REFERENCE TO RELATED APPLICATIONS

This application is a continuation of U.S. application Ser. No. 14/002,076, filed Aug. 28, 2013, which is a national phase application under 35 U.S.C. §371 of PCT International Application No. PCT/EP2012/054645, filed Mar. 16, 2012, which claims priority to German Application No. 10 2011 001 404.7, filed Mar. 18, 2011, the disclosures of which are incorporated by reference herein.

FIELD AND BACKGROUND OF THE INVENTION

The invention relates to a milking cluster and a milking parlor having such a milking cluster, for the automatic milking of milk-producing animals.

Document EP 0 647 390 B1 describes a structure for the automatic milking of animals and a displaceable cup covering means which, prior to a positioning operation of the milking cup, which is also called the teat cup, is displaced onto a teat of an udder of an animal to be milked and, after the milking operation, is displaced over all the teat cups. All the teat cups are covered together. Thus, during a positioning operation, the teat cups that are not yet positioned are open. This applies during the entire milking sequence if the animal does not have four teats (also referred to as a "three-point" udder). If one or more cups are removed from the teat when the milk flow is exhausted, whilst others are still in the milking position, said milking cups are also not protected for this period. An additional actuator is necessary to actuate the cup covering. The teat cups are connected to a pulling element arrangement, by means of which they are pulled against a holder and are fixed there.

EP 0 862 360 B1 describes a protective device as a part of a robot arm, beneath which the teat cups are arranged so as to be movable. The structure, however, is expensive, as additional tilt apparatuses and actuators are necessary for each milking cup.

Against this background, the object of the invention consists in providing an improved arrangement as well as a milking parlor.

SUMMARY OF THE INVENTION

The arrangement includes a milking cluster for a milking parlor for the milking of milk-producing animals, said milking cluster having at least one teat cup unit with a housing, a teat cup, a drive device and a pulling element arrangement which is connected to the teat cup, wherein the pulling element arrangement has a segment unit with at least two pulling elements.

The at least one teat cup unit can be movable out of a park position in which the teat cup assumes a position which is inclined with respect to the perpendicular, e.g. an almost horizontal position, into a positioning position in which the teat cup is in almost perpendicular position, into a milking position in which the teat cup is connected to an associated teat of the animal to be milked, and back again.

As an alternative to this, the at least one teat cup unit can be movable out of a park position into a positioning position in which the teat cup is in an almost perpendicular position, into a milking position in which the teat cup is connected to an associated teat of the animal to be milked, and back again.

The milking cluster can be moved, for example, by a robot arm in such a manner that the teat cups are moved individually out of a park position into a positioning position and in a milking position are suspended from the corresponding teats of the animal to be milked and at the end of the milking operation are removed from the teats, wherein they are firstly moved back into the positioning position and then into the park position.

Each teat cup is able to be moved separately into its park position, no additional actuator is necessary.

Contamination of the teat cups is effectively prevented by means of the park position of the same.

Teat cups that are trailing or have fallen out of line or even fallen off can be moved back immediately into the park position and consequently do not fall onto the ground and become contaminated.

The risk of pulling elements becoming fouled up is minimized in a considerable manner as said pulling elements are situated inside a segment unit.

A simple design without guides and rollers makes a simple service and consequently cost savings possible.

In one design, the segment unit can have a fixing device, a tilt segment, at least one intermediate segment and a fixing segment, wherein the fixing device is fixedly connected to the teat cup and the fixing segment is fixedly connected to the housing. A flexibility and mobility of the teat cup is achieved by means of individual segments when the pulling element arrangement is loosened or slackened. Only a small length of the pulling elements to be exposed is necessary, e.g. 60 mm compared to 220 mm in the prior art.

The fixing device can have an inclined tilt portion, and the tilt segment can have an inclined contact portion which corresponds to the inclined tilt portion. Consequently, it is possible to pivot and position the park position in a manner that can be fixed beforehand.

The at least two pulling elements of the pulling element arrangement are arranged one above the other. Thus, a narrow and sturdy segment unit is achieved when it is fixed.

In one design, the at least two pulling elements of the pulling element arrangement can be connected to a tilt lever which is operatively connected to the drive device and a tilt drive. Consequently, by means of two pulling elements the teat cup can not only be fixed but also pivoted into the park position.

The tilt lever can be movable by means of the drive device into a first position in which the at least two pulling elements are tensioned, wherein the segment unit, contracted, is engaged and the at least one teat cup is in the positioning position, and the tilt lever can be movable by means of the drive device into a second position in which the at least two pulling elements are slackened, wherein the at least one teat cup assumes the milking position.

For this purpose, in its first position the tilt lever can be pivotable by means of the tilt drive about a tilt axis into a pivot position in which a pulling element of the at least two pulling elements is shortened and the other is lengthened, wherein the inclined tilt portion of the fixing device and the inclined contact portion of the tilt segment are engaged and the at least one teat cup is pivoted into the park position.

In an alternative design, the segment unit can have a fixing device, a cover segment, at least one intermediate segment and a fixing segment, wherein the fixing device is fixedly connected to the teat cup and the fixing segment is fixedly connected to the housing. As a result, each teat cup can be covered separately. No additional drives are necessary.

The cover segment can be fixedly connected to a cover. Simple integration of the cover in the segment unit is possible in this manner.

The covering is effected by, in the park position, a head with a teat opening of the at least one teat cup being covered by a cover cap of the cover of the cover segment. The cover pivots automatically over the teat cup when said teat cup assumes the park position and releases it automatically when the park position is relinquished. To this end, the cover segment can be connected to the teat cup by means of at least one entrainment means with axial mobility. The axial mobility makes it possible for the teat cup and the cove segment to achieve different positions with respect to one another in the park position, as a result of which the cover is able to pivot over the teat cup and cover it.

A carrier piece, on which at least one of the intermediate segments rests, can be arranged beneath the fixing segment on the housing. The achievement of this is that the teat cup does not rest on the ground in the park position, i.e. does not hang down too low and can touch the ground, as a result of which further contamination and sucking in of dirt is prevented.

The at least two pulling elements of the pulling element arrangement can be arranged side by side in said alternative design. This produces a sturdy position in a fixed position.

The at least two pulling elements of the pulling element arrangement are operatively connected to a drive device, it being possible to use cylinders with a small stroke and diameter.

A compact design of the entire milking cluster is produced, as a result of which a large degree of mobility and additional installation space are created on the milking cluster for additional devices, such as, for example, positioning and recognition systems (camera).

It is provided that the at least two pulling elements are movable by means of the drive device into a first position in which they are tensioned, wherein the segment unit, contracted, is engaged and the at least one teat cup is in the positioning position, and that the at least two pulling elements are movable by means of the drive device into a second position in which they are slackened, wherein the at least one teat cup is moved by means of its gravitational force into the park position or assumes the milking position.

In a further alternative design, the segment unit can have a fixing device, at least one intermediate segment and a fixing segment, wherein the fixing device is fixedly connected to the teat cup and the fixing segment is fixedly connected to the housing.

A milking parlor for milking milk-producing animals can be provided with the above-described milking cluster.

In this case, the milking cluster can be attached on a support arm device or a robot arm.

In further designs, said milking cluster is attached in a flexible manner to the support arm device or the robot arm. This can be effected, for example, by means of a coupling element which has elastic and flexible characteristics. Said characteristics can be present materially in said part or can be formed by a resilient structure of the coupling element. This enables an elastic resilience between the milking cluster and the support arm device or robot arm. This reduces both damage to the milking cluster and the support arm device or to the robot arm and also the risk of injury to the animals to be milked, e.g. if said animals kick. In this connection it must be considered that, for example, an average German milking cow weighs approximately 650 kg.

A method for positioning an above-described milking cluster is characterized in that during an operation for positioning the teat cups onto the teats of an udder of an animal to be milked, at the start of moving the milking cluster perpendicularly upright in the direction of the udder, the teat cups which are not positioned are taken out of their positioning position and moved into the park position.

In addition, it is possible for teat cups which are already in the milking position to be able to be laterally mobile without exerting disruptive pulling forces on said teat cups which are in the milking position.

Through the separate mobility of the teat cup units, the milking cluster can also be used for milk-producing animals with udders with four or even three teats.

A high level of robustness is achieved for when kicks are directed at the teat cups the segments yield and then are automatically refixed.

Advantageous further developments and developments of the milking cluster or of the milking parlor are the object of the respective dependent claims.

Further advantages and details proceed from the exemplary embodiments shown in the figures of the drawing, in which:

BRIEF DESCRIPTION OF THE DRAWINGS

FIGS. 8, 8a and 8b show schematic views of the second exemplary embodiment according to FIG. 7;

FIG. 14 shows a schematic perspective view of the second exemplary embodiment according to FIG. 7 in the milking parlor according to FIG. 1; and FIG. 15 shows a schematic perspective view of a third exemplary embodiment of the milking cluster.

DETAILED DESCRIPTION OF THE DRAWINGS

Identical or similar function elements are provided with the identical references in the figures.

Figure 1:
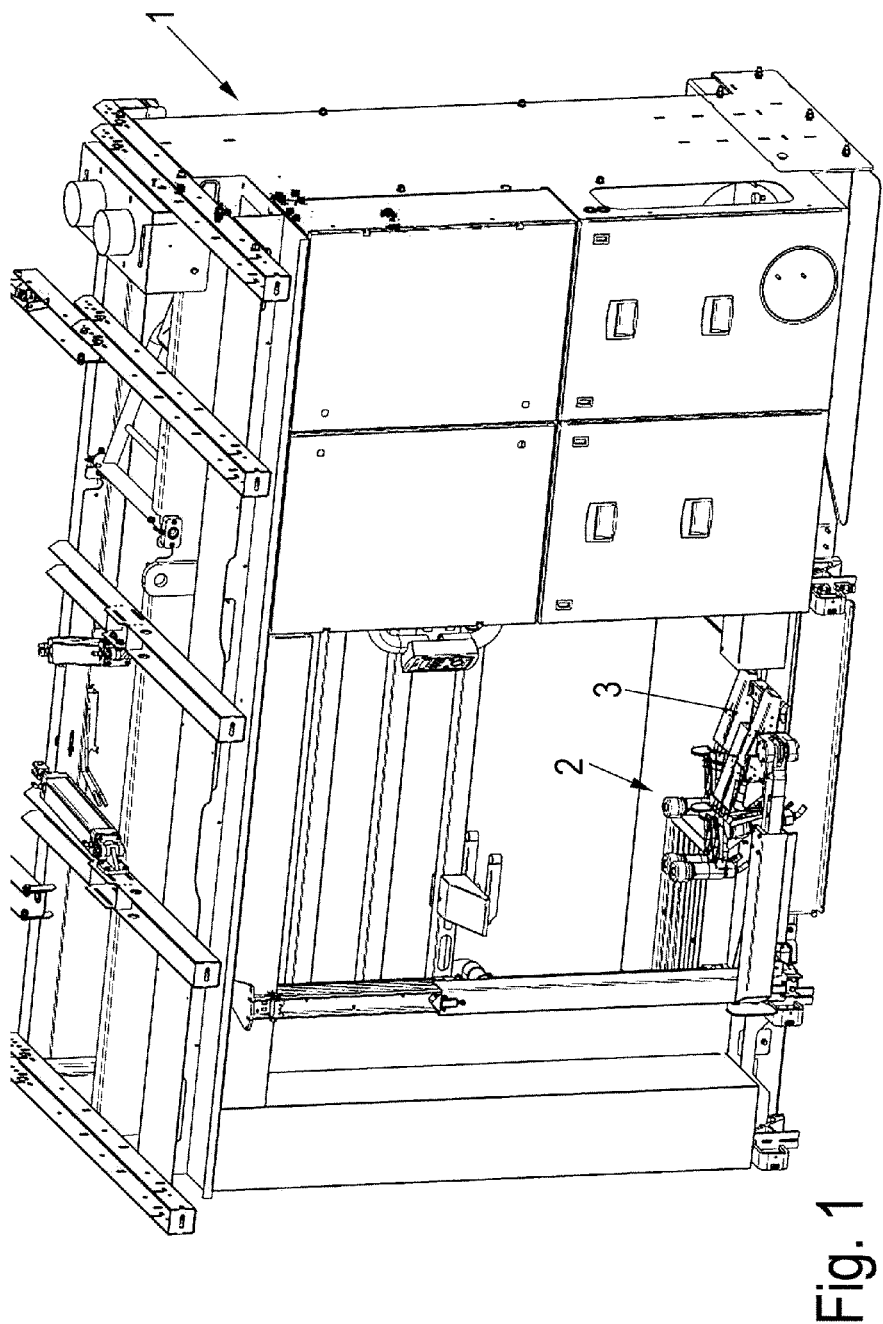
FIG. 1 shows a perspective representation of a milking parlor as claimed in the invention.

FIG. 1 shows a perspective representation of a milking parlor 1 with a milking cluster 2 and a carrier 3. The milking cluster 2, in this case, is attached on the carrier of a support arm device (not shown in any more detail) which is actuatable automatically or by means of a robot (not shown) for assuming different positions for milking and for adjusting different positions of teat cup units of the milking cluster 2. Several such milking parlors 1 can be arranged in a row and operated by one single robot.

The milking cluster 2 can also be mounted on a robot arm.

The function of the support arm device is to carry the milking cluster 2 so that the weight is balanced and so that it is so smooth running that the carrier 3 follows the movements of the animal to be milked.

If the milking cluster 2 is fastened on such a support arm device, a robot arm is docked onto the support arm device for positioning the teat cup units 4 automatically, which will be described in more detail below. The robot arm moves the support arm device or the carrier 3 together with milking cluster 2 to the teats of the animal to be milked and positions the teat cups 4 one after another on the associated teats. To this end, the teat cups 4 are moved out of a park position in which they are substantially horizontal or are in a position which is inclined with respect to the perpendicular, first of all into a positioning position in which they are substantially perpendicular. The teat cups 4 can naturally also be in a position which is inclined with respect to the perpendicular in the park position.

As soon as all the teats are positioned in a so-called milking position, the robot arm is detached from the carrier 3 and, where applicable, moves to the next milking parlor location in order to position the teat cups 4 there. During the milking phase, the teat cups 4 are suspended with the milking cluster 2 from the carrier 3 which follows the movements of the animal. As soon as the milk flow of one teat is exhausted, the corresponding teat cup 4 is removed from the teat into the positioning position and, to protect against the ingress of dirt, is moved into the park position. The three different positions will be explained in more detail below. As soon as all the teat cups have been removed and are in the park position, the carrier 3 pivots with the milking cluster 2 from the position under the animal into the position next to the animal such that the animal is able to leave the milking location.

Figure 2:
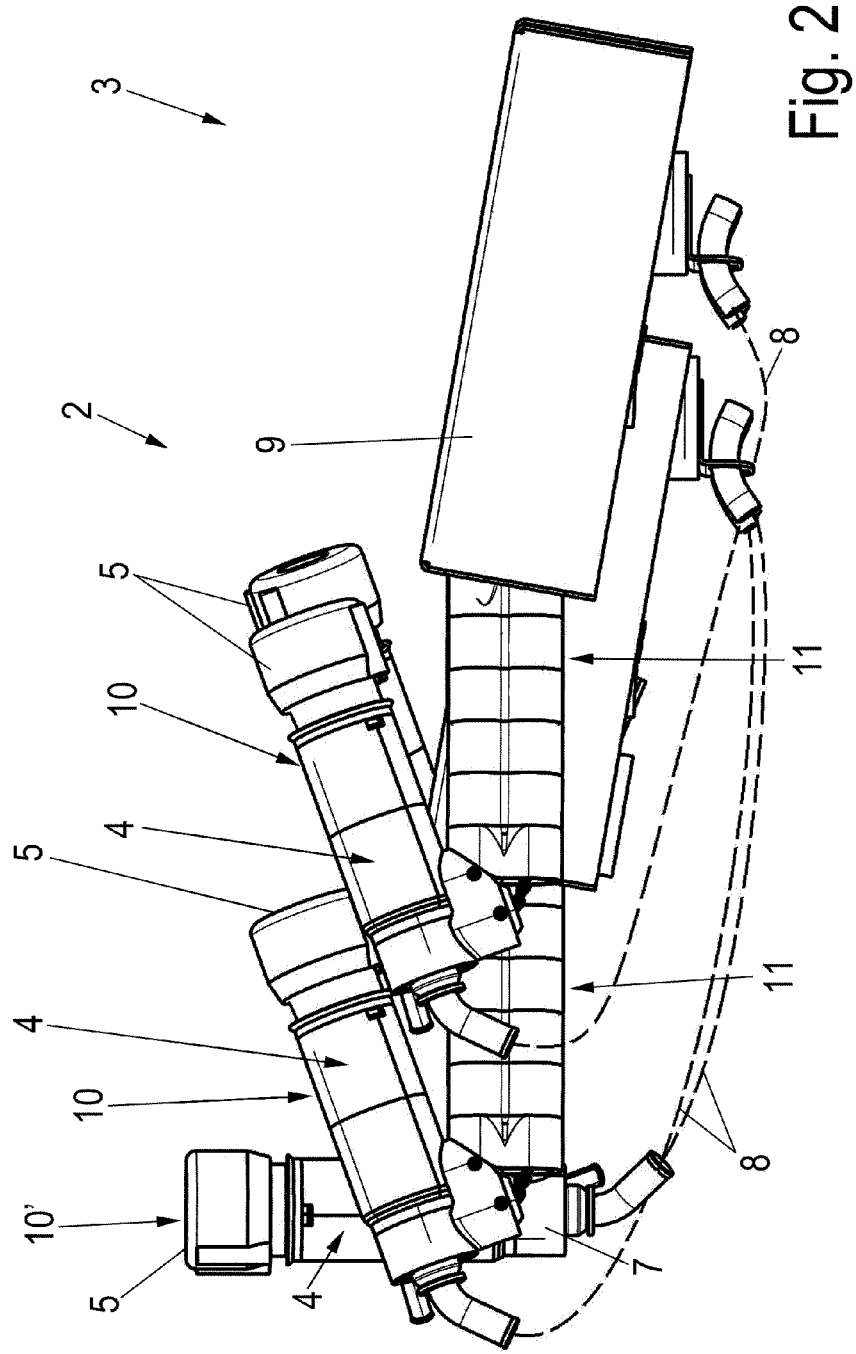
FIG. 2 shows a side view of a first exemplary embodiment of a milking cluster as claimed in the invention with teat cup units in the positioning and park position.
Figure 3:
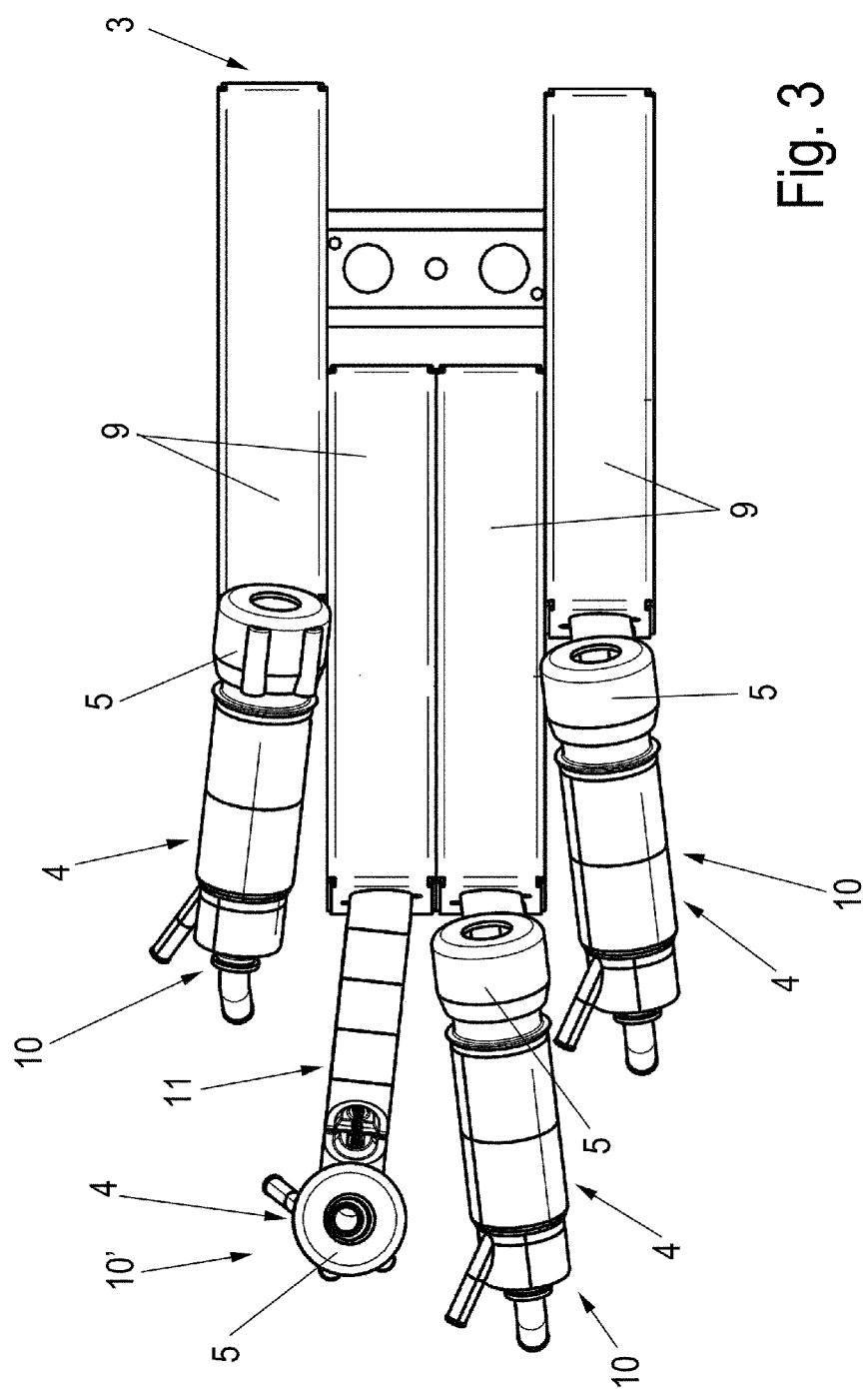
FIG. 3 shows a top view of the milking cluster according to FIG. 2.

FIG. 2 shows a side view of a first exemplary embodiment of a milking cluster 1 as claimed in the invention with teat cup units 10, 10' in the positioning and park position. FIG. 3 shows a top view of the milking cluster 2 according to FIG. 2.

In this case, two front teat cup units 10' are shown in the positioning position and two rear teat cup units 10 are shown in the park position. Normally, only one teat cup unit 10' is in the positioning position, FIGS. 2 and 3 are only to emphasize the difference.

The milking cluster 2, in this exemplary embodiment, has four teat cup units 10, 10' which are arranged side by side in their longitudinal directions and in each case have a housing 9. Each of the four teat cup units 10, 10' is able to assume one of the three different positions (park position, positioning position and milking position) independently of the others.

Figure 5:
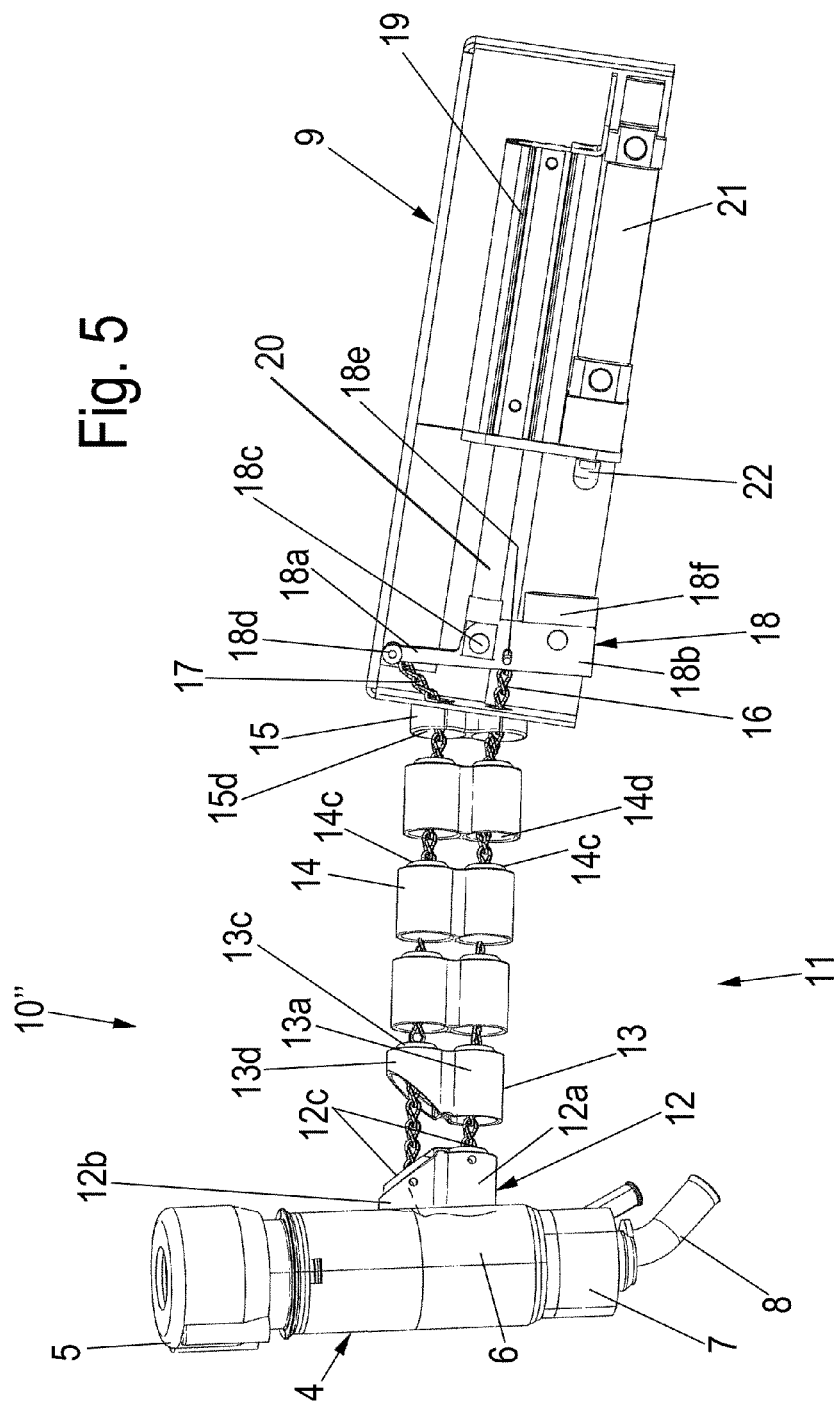
FIG. 5 shows a side view of the teat cup unit according to FIG. 4 in the milking position.
Figure 6:
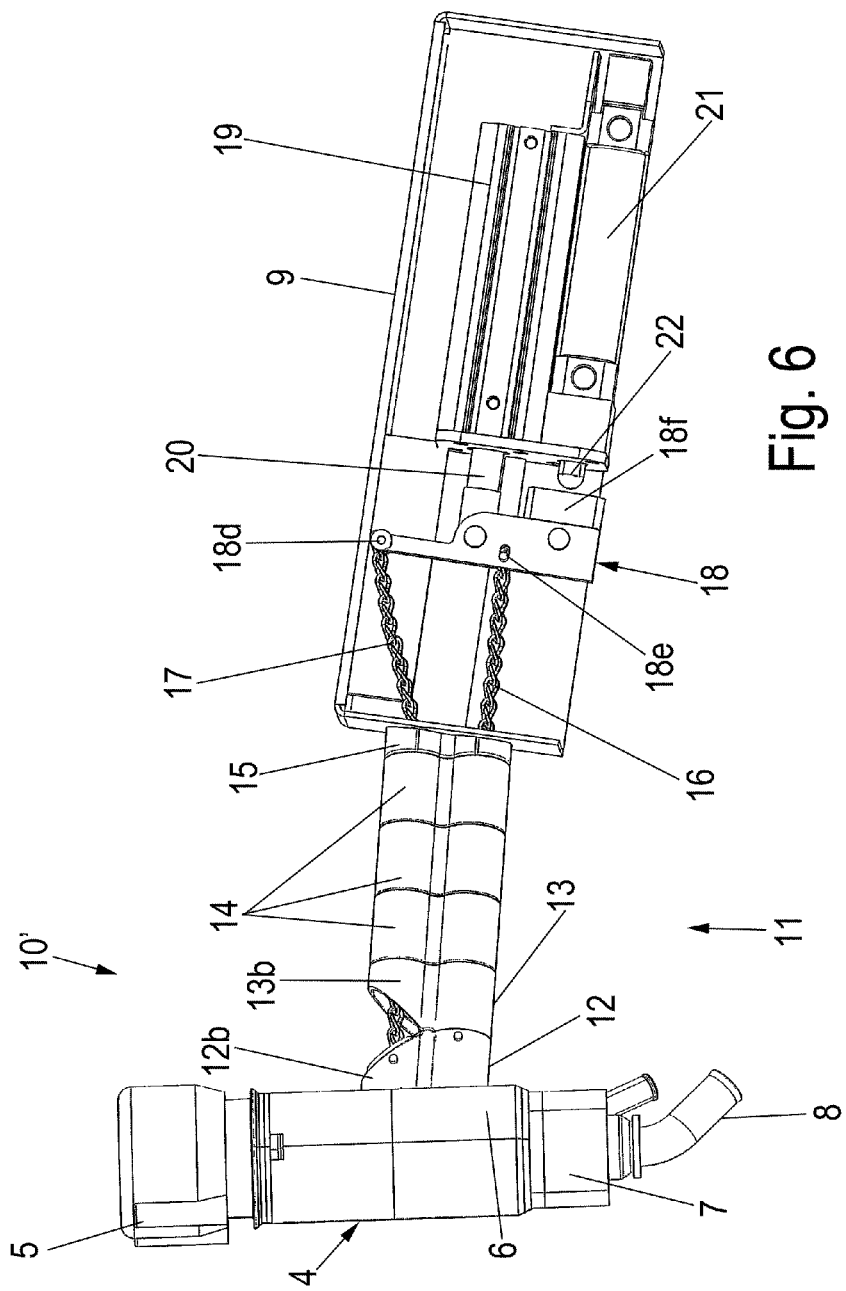
FIG. 6 shows a side view of the teat cup unit according to FIG. 4 in the positioning position.

For better clarity, FIGS. 2 and 3 show two of the four teat cup units 10, 10' in the park position (see FIG. 4) and two in the perpendicular positioning position (see FIG. 6). In the park position, the respective teat cup unit 10 is non-used and is pivoted out of the upright position into the horizontal or into a position which is inclined with respect to the perpendicular. The third position is the milking position which is shown in FIG. 5. To differentiate better, the teat cup unit 10 in the park position is provided with the reference 10, in the positioning position the reference 10' and in the milking position the reference 10".

Each teat cup unit 10 has a teat cup 4 with a teat rubber which has a head 5 and a shaft, a coupling portion 6 and a connection portion 7. The head 5 has a teat opening (see FIG. 3) for the insertion of a teat (not shown). The coupling portion 6 and the connection portion 7, which is connected to a hose unit 8 for vacuum application and milk suction, is arranged at a spacing from the head 5 on the bottom end of the shaft.

The coupling section 6 is connected to a pulling element arrangement. The pulling element arrangement includes a segment unit 11 which has in its interior two pulling elements 16, 17 which are arranged one above the other and will be described in more detail in conjunction with FIG. 4.

The carrier 3 is provided with a fastening arm 3a for fastening on a support arm device or robot arm device (not shown).

Figure 4:
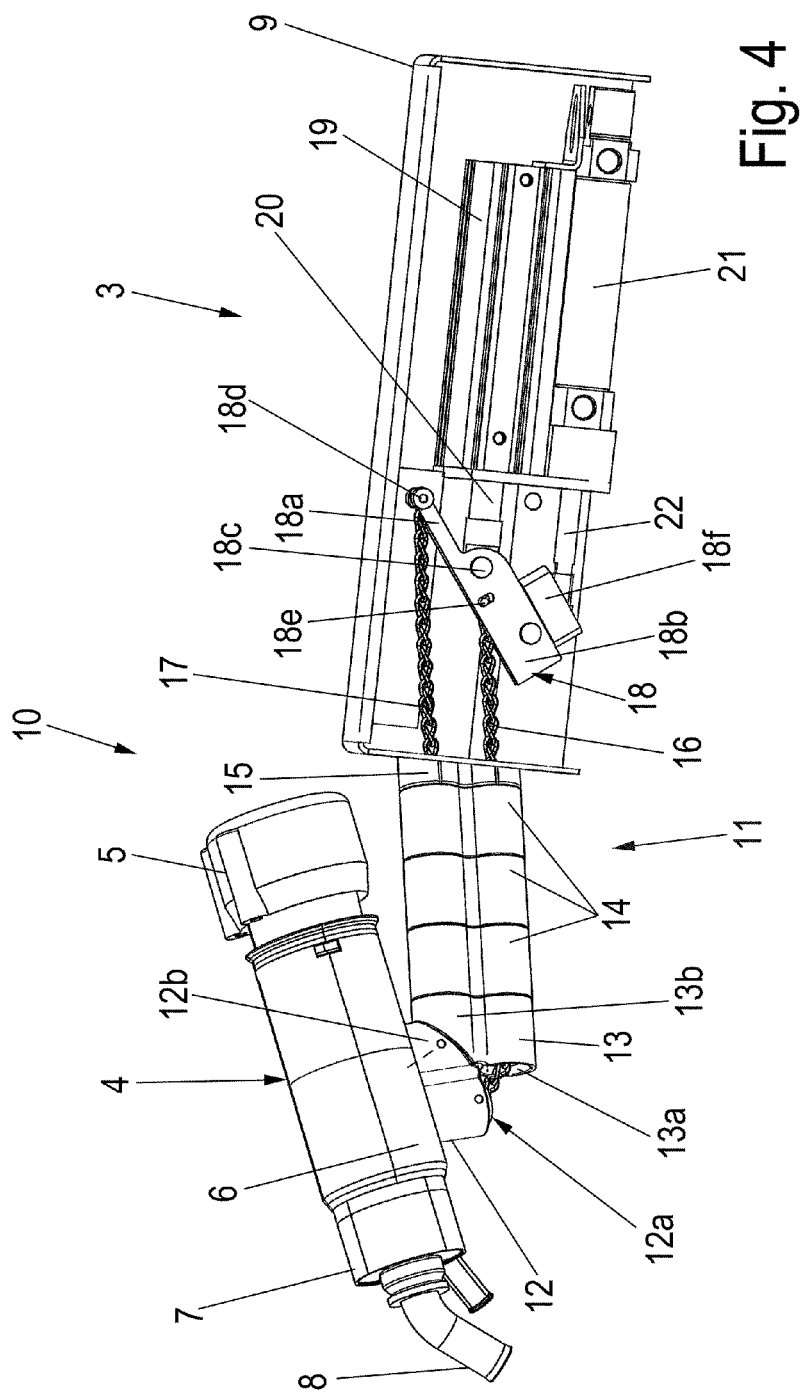
FIG. 4 shows a side view of a teat cup unit of the milking cluster according to FIG. 2 in the park position.

FIG. 4 shows a side view of the teat cup unit 10 of the milking cluster according to FIG. 2 in the park position. FIG. 5 shows a side view of the teat cup unit 10 according to FIG. 4 in the milking position and FIG. 6 illustrates a side view of the teat cup unit 10 according to FIG. 4 in the positioning position. The housing 9 is shown open at the side.

The connection portion 6 of the teat cup 4 has a fixing device 12 which is provided to cooperate with a corresponding tilt segment 13 of the segment unit 11. The fixing device 12 has a fixing portion 12a which is arranged in the interior of the fixing device 12 both at the bottom and at the top in a tilt portion 12b running around on the inner edges thereof.

The tilt portion 12b is beveled, a bevel angle being for instance 45° and influencing the tilted or pivoted park position of the teat cup 4 in cooperation with a corresponding upper contact portion 13b of the tilt segment 13.

The segment unit 11 has several intermediate segments 14 which are arranged between the tilt segment 13 and a fixing segment 15 which is attached on the housing 9. All the segments 13 and 14 have a circumferential fixing portion 13c and 14c (see FIG. 5). The respective fixing portions 12c, 13c and 14c cooperate with corresponding receiving portion 13d, 14d, 15d of the respective contracted segments 12, 13, 14, 15 of the segment unit 11 (FIGS. 4 and 5).

The segment unit 11 in shown in the park position in FIG. 4 in a contracted position. In this case, all the intermediate segments 14, as described briefly above, abut in a positive locking manner against one another/in one another and in/against the fixing segment 15. The tilt segment 13 in the park position contacts the top tilt portion 12b of the fixing device 12 by way of its top contact portion 13b.

The contracted state of the segment unit 11 is brought about by tensioning the pulling elements 16, 17 which are located one above the other and are, for example, chains. A respective end of the pulling elements 16, 17 is pivotally mounted in the fixing device 12 of the teat cup 4 and a respective other end of the pulling elements 16, 17 is guided into the housing 9 by means of the fixing element 15 and connected to a tilt lever 18 in the housing 9.

A drive device 19, which is connected to the tilt lever 18 by way of a drive rod 20, is also arranged in the housing 9. In addition, a tilt drive 21 with a tilt rod 22 is attached below the drive device 19.

The tilt lever 18 includes a tilt portion 18a and a pulling portion 18b. Between said portions 18a and 18b, the tilt lever 18 is connected to an end of the drive rod 20 of the drive device 19 in a tilt axis 18c so as to be pivotable about the same. The drive device 19 is, for example, a pneumatic cylinder, just as the tilt drive.

Below the tilt axis 18c, the end of the first pulling element 16 is pivotally mounted in a coupling 18e on the top region of the pulling portion 18b of the tilt lever 18 and the end of the second pulling element 17 is pivotally mounted in a coupling 18d on the top end of the tilt portion 18a.

The pulling portion 18b of the tilt lever 18 is provided to the side of the tilt drive 21 with a pressure portion 18f which is provided for cooperation with the end of the tilt rod 22 of the tilt drive 21.

To contract the segment unit 11, the drive rod 20 of the drive device 19 is pulled into the same, the tilt lever 18 pulling the pulling elements 16, 17, which are pivotally mounted thereon, in the direction of the housing 9 and the fixing device 12 and the segments 13, 14 and 15 being pulled together into one another. In this case, the teat cup 4 is initially moved into a perpendicular position which forms the positioning position, which is shown in FIG. 6. In this connection, the bottom portions of the fixing device 12 and of the tilt segment 13 are engaged and in contact.

To assume the park position, the tilt lever 18 is pivoted by the tilt drive 21 about the tilt axis 18c by the tilt drive 21 moving the tilt rod 22 out in the direction toward the tilt lever 18 and the tilt rod 22 in contact with the pressure portion 18f pivoting the tilt lever 18. The effect of this is that the second top pulling element 17 is pulled by the tilt portion 18a, which is pivoted clockwise, further in the direction of the housing 9 and pivots the teat cup 4 correspondingly out of the almost perpendicular positioning position into the park position, which is shown almost horizontal but can also be a position which is inclined with respect to the perpendicular. At the same time, the bottom, first pulling element 16 is lengthened somewhat in order to enable the teat cup 4 to pivot. The length between the coupling 18e and the tilt axis 18c, in this case, is clearly less than that of the length between the tilt axis 18c and the coupling 18d of the top pulling element 17. The associated ratio is approximately 1:3.

If the teat cup 4 is connected to an associated teat of the udder of the animal to be milked in the positioning position according to FIG. 6, the milking position according to FIG. 5 is thus assumed by the drive piston 20 of the drive device 21 being extended in the direction of the teat cup 4. In this case, the pulling elements 16, 17 are lengthened and slackened such that the fixing device 12 and the segments 13, 14 and 15 no longer contact one another and rest loosely on the pulling elements 16, 17. This results in free mobility of the teat cup 4.

In the milking position, the teat cups 4 are suspended in each case from a teat of the udder of the animal to be milked. In this case, the pulling elements 16, 17 which are slackened or loosened in this manner, also make it possible in the milking position for the other teat cups 4 to have a lateral freedom of movement for approaching and positioning.

If the milk flow of one teat is exhausted, and the teat cup 4 is to be removed from said teat out of the milking position, the drive device 19 moves the tilt lever 18 in the direction away from the teat cup 4, as result of which the pulling elements 16, 17 are shortened between the teat cup 4 and the fixing segment 15. As a result the teat cup 4 is pulled downward and by means of the intermediate segments 14, the fixing device 12 and the fixing segment 15 is moved into the fixed, perpendicular positioning position again. This is also effected if the teat cup 4 is trailing, is out of line or has fallen off.

Figure 7:
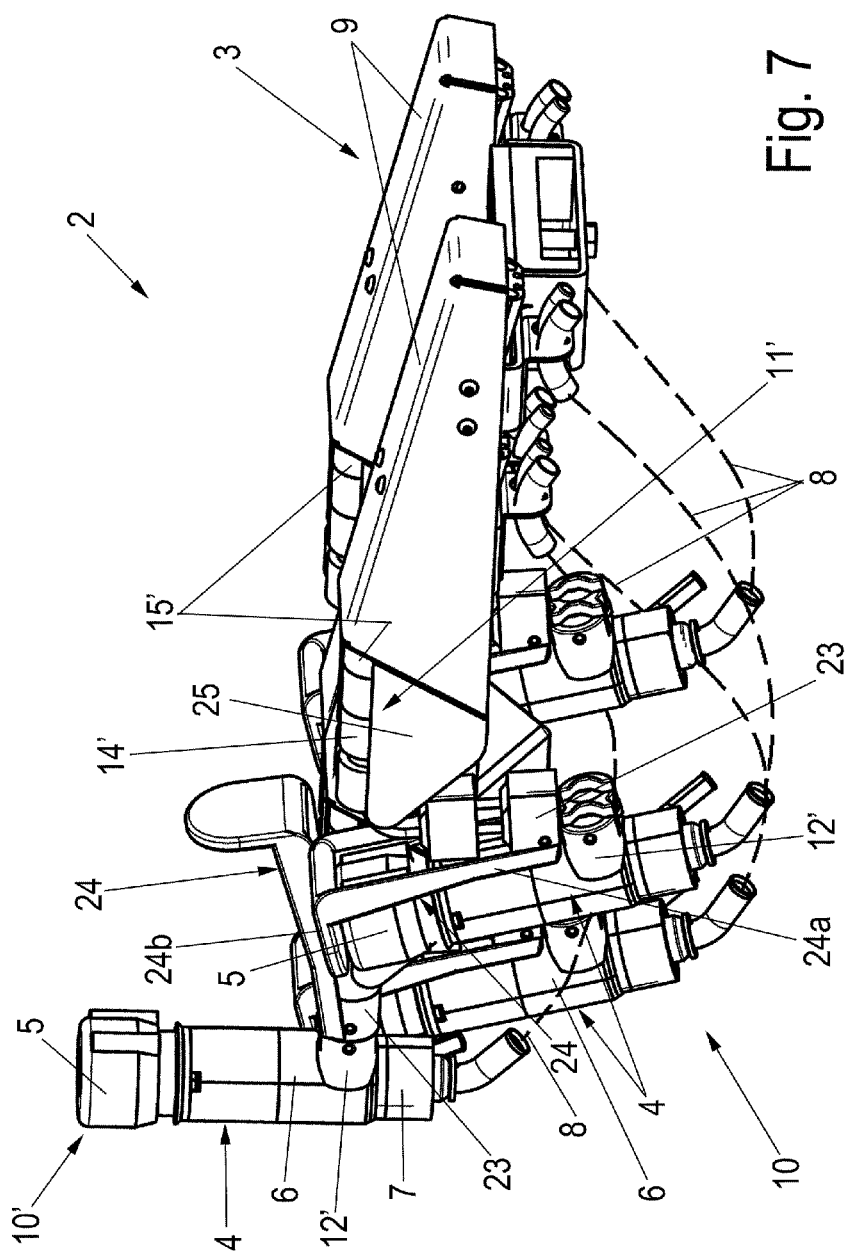
FIG. 7 shows a schematic perspective view of a second exemplary embodiment of the milking cluster.
Figure 8:
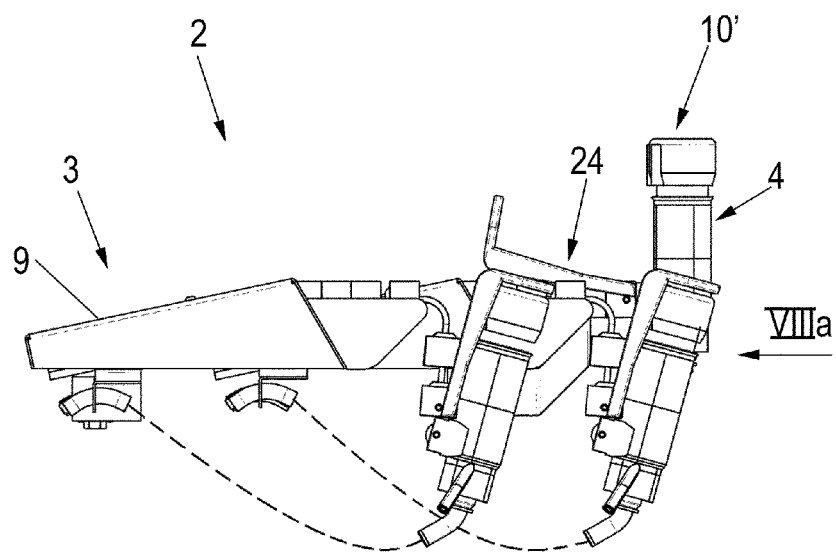
Figure 8A:
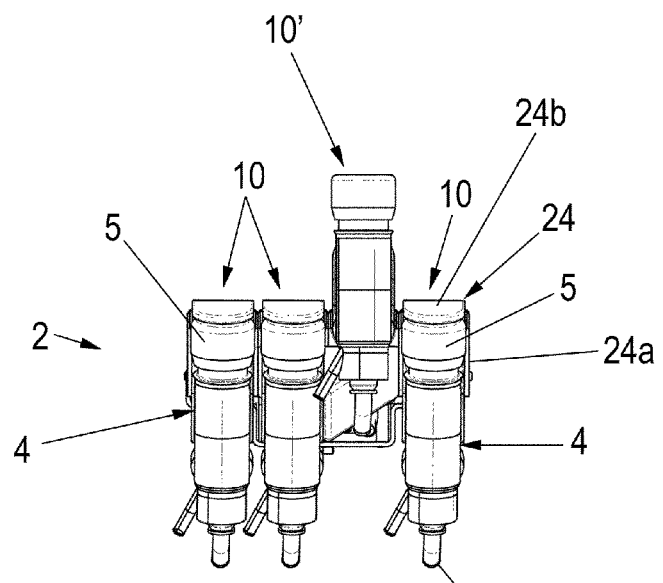

FIG. 7 shows a schematic perspective view of a second exemplary embodiment of the milking cluster 2. One teat cup unit 10' is shown in the positioning position and three teat cup units are shown in the park position, this is effected for reasons of clarity in the drawing. FIGS. 8, 8a and 8b show schematic views of the second exemplary embodiment according to FIG. 7, FIG. 8 showing a side view, FIG. 8a a front view and FIG. 8b a top view of the milking cluster 2.

The second exemplary embodiment differs from the first exemplary embodiment in the structure of the segment unit 11' of the pulling element arrangement.

Instead of the tilt segment 13 of the first exemplary embodiment (FIGS. 4 to 6), the segment unit 11' has a cover segment 23 which is arranged between the first intermediate segment 14' and the fixing device 12' of the teat cup 4. The fixing device 12', in this case, does not have any bevels.

The segment unit 11' has pulling elements 16' which are arranged side by side and are guided inside the fixing device 12' and the segments 14', 15'.

The respective housing 9 of each teat cup unit 10, 10' is provided in the direction of the teat cup 4 with a carrying piece 25 which is arranged below the segment unit 11'. The length of the carrying piece 25 is dimensioned, for example, in such a manner that a large part of the intermediate segments 14', in the example shown all of the intermediate segments 14', rest on said carrying piece. In addition, in this case the carrying piece 25 also has lateral guides.

The cover segment 23 is connected to a cover 24. The cover 24 has cover arms 24a which are connected to the cover segment 23 and to a cover cap 24b. The cover segment 23 is described in more detail below.

In the positioning position of the teat cup unit 10', the cover segment 23 is fixed between the intermediate segments 14' and the fixing device 12', the cover 24 being arranged above the segment unit 11' and the head 5 of the teat cup 4 being uncovered.

In the park position of the teat cup unit 10, the cover segment 23, with the slackened pulling elements 16', is no longer fixed but rests on the top surface of the fixing device 12' in such a manner that the cover cap 24b of the cover 24 closes the head 5 on its top surface and its teat opening. In this case, the cover arms 24a extend approximately parallel to a longitudinal axis of the teat cup 4.

Figure 9:
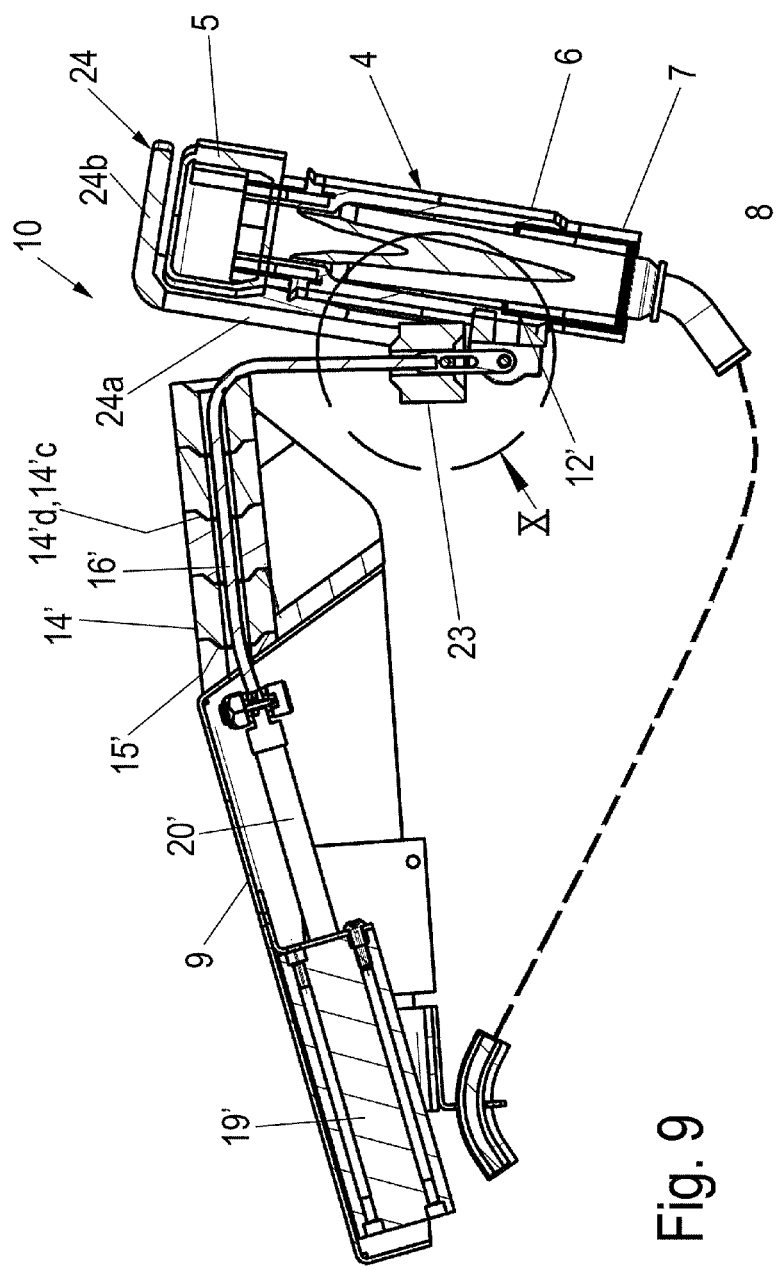
FIG. 9 shows a schematic longitudinal sectional view along the line IX from FIG. 8b.
Figure 10:
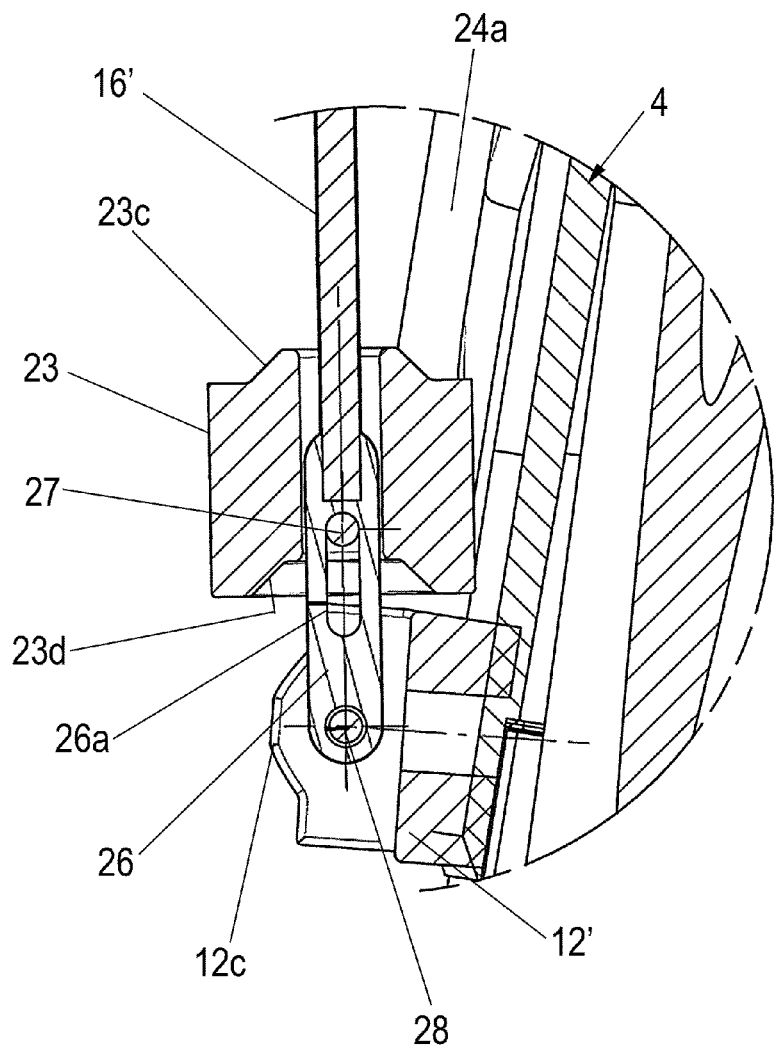
FIG. 10 shows an enlarged sectional view of the region X from FIG. 9.

The park position is described further in conjunction with FIGS. 9 and 10. FIG. 9 shows a schematic longitudinal sectional view along the line IX from FIG. 8b and FIG. 10 illustrates an enlarged sectional view of the region X from FIG. 9.

FIG. 9 shows the teat cup unit 10" in the park position. A drive device 19' with a drive rod 20' is arranged inside the housing 9. The drive rod 20' is connected to the side-by-side pulling elements 16', only one of which is shown in this case. The pulling elements 16' extend inside the segments 15', 14' and 23. The other respective end of a pulling element 16' is fastened on an entrainment means 26. In the park position shown, the pulling elements 16' are slackened. The intermediate segments 14' are supported and held by the carrying piece 25, the teat cups 4 moving downward by means of gravitational force. In this case, the cover segment 23 is entrained into the position shown and already mentioned above. The cover cap 24b of the cover 24 covers the teat opening on the head 5 of the teat cup 4.

Each entrainment means 26 on the respective end of the pulling elements 16' is pivotably mounted by way of its other end, which is not connected to the respective pulling element 16', on the fixing device 12' of the teat cup 4 by means of a pivot bolt 28 so as to be pivotable. The cover segment 23 can move axially with respect to the entrainment means 26 which are arranged in its interior. Said movement, however, is restricted as the cover segment 23 is fixedly connected to a stop pin 27, which extends through elongate holes 26a of the entrainment means 26.

Figure 9A:
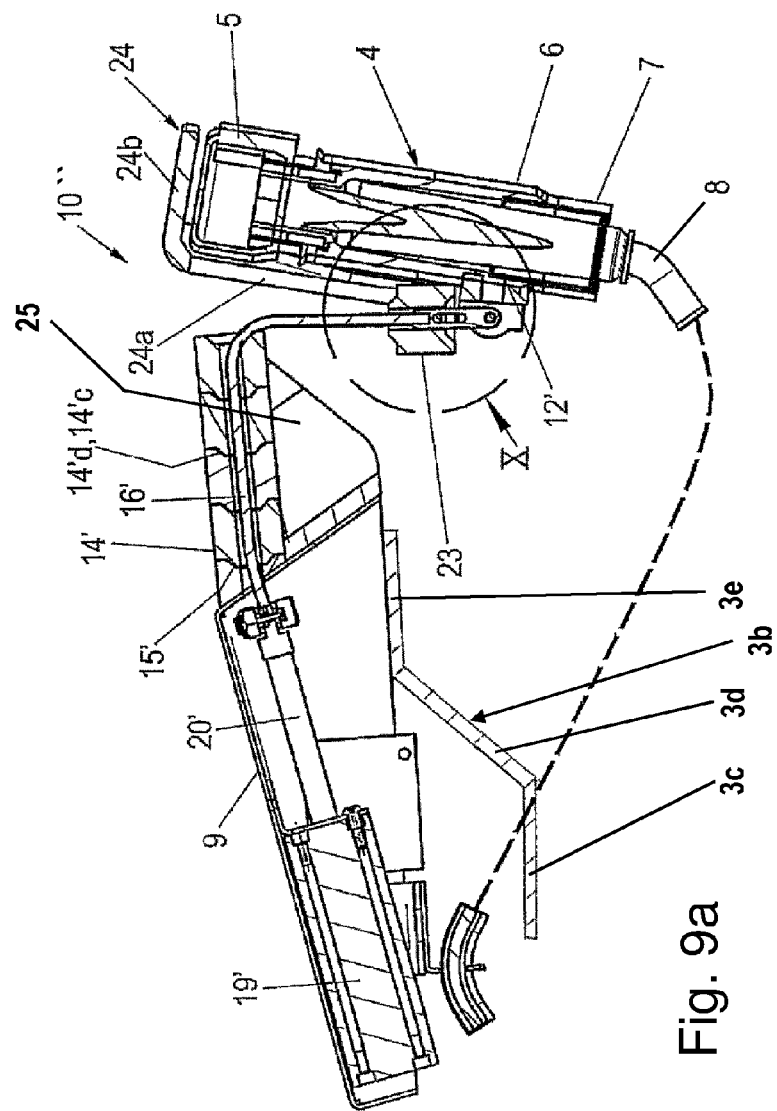
FIG. 9a shows a further schematic longitudinal sectional view along the line IX from FIG. 8b with a variation in the second exemplary embodiment according to FIG. 7.

FIG. 9a shows a further schematic longitudinal sectional view along the line IX from FIG. 8b with a variation of the second exemplary embodiment according to FIG. 7. Unlike the view according to FIG. 9, a coupling element 3b is provided for coupling the milking cluster 2 in a flexible manner to a support arm device or a robot arm. The coupling element 3b has a first fastening portion 3c for fastening on the support arm device or the robot arm. The first fastening portion 3c is connected by means of an angled web portion 3d to a second fastening portion 3e, by means of which the coupling element 3b is fastened on the milking cluster 2, for example on the housing 9 thereof. The fastening of the fastening portions 3c and 3e can be effected, for example, by means of screws or rivets. Welding or designing the coupling element 3b integrally with the housing 9 can also be conceivable.

The coupling element 3b enables the milking cluster to be attached in a flexible manner on the support arm device or the robot arm. It can be produced, for example, from a spring material for this purpose. It is also possible for it to be a combination of fixed fastening portions 3c and 3e and an elastic, flexible web portion 3d. Other flexible designs are easily imaginable.

As a result of the flexible coupling element 3b, a type of kick guard is formed. This means that there is an elastic resilience between the milking cluster 2 and the support arm device or robot arm in the case of impacts such as, for example, can occur as a result of kicks of an animal to be milked.

Figure 11:
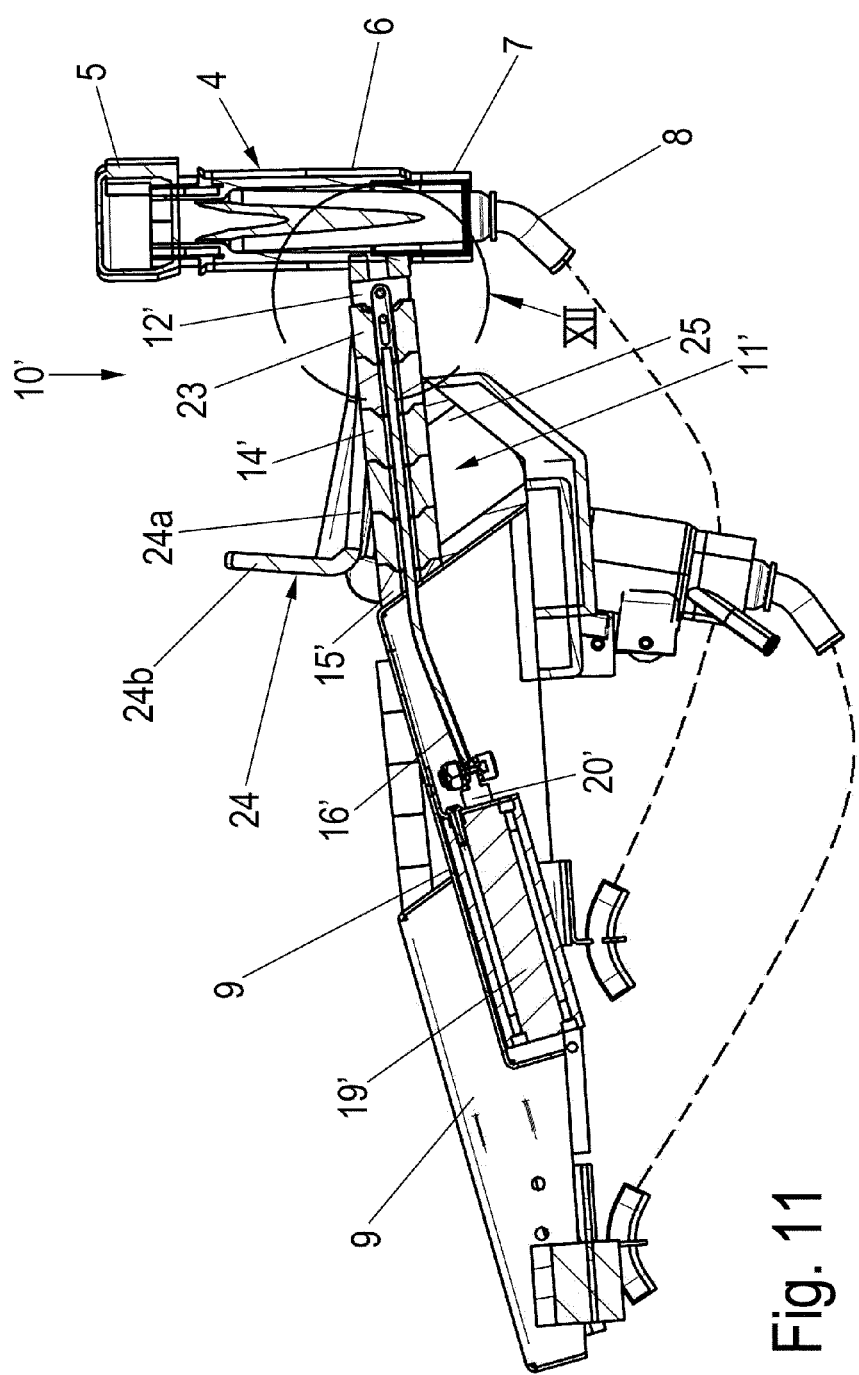
FIG. 11 shows a schematic longitudinal sectional view along the line XI from FIG. 8b.
Figure 12:
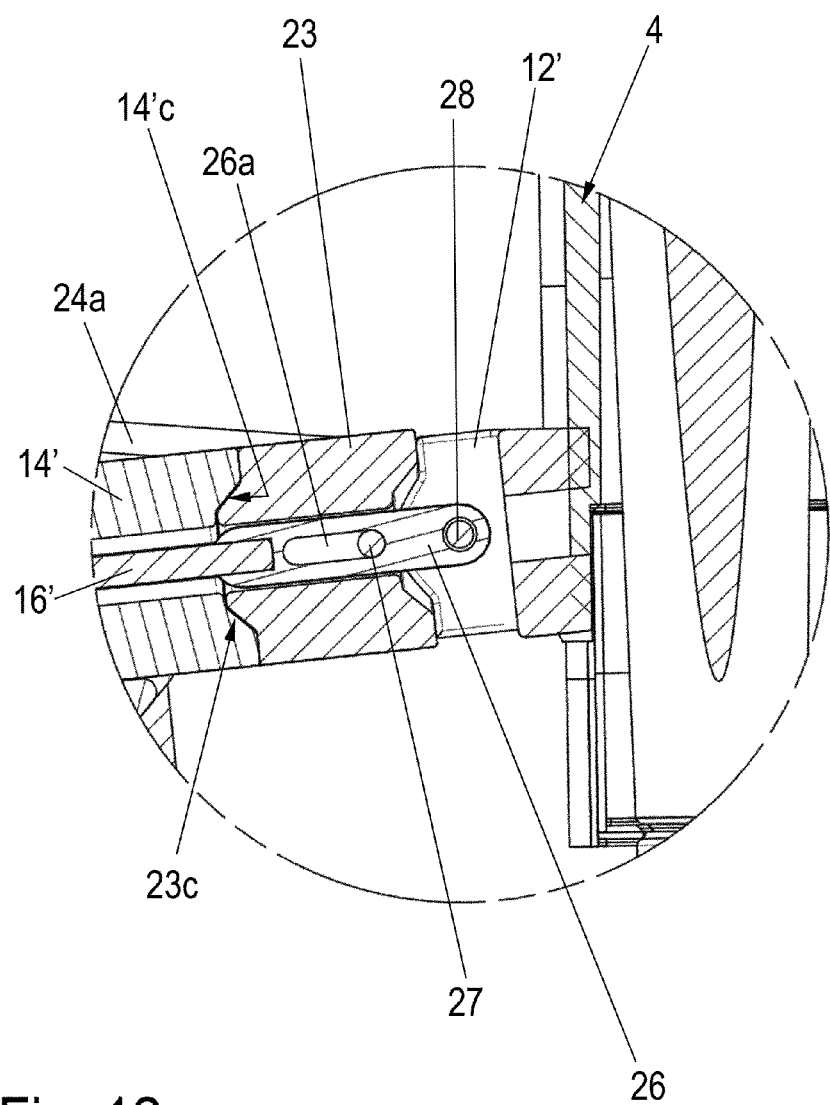
FIG. 12 shows an enlarged sectional view of the region XI from FIG. 11.

FIG. 11 illustrates a schematic longitudinal sectional view of the positioning position along the line XI from FIG. 8b, and FIG. 12 shows a sectional view of the region XI from FIG. 11, enlarged compared to FIG. 11.

If the drive device 19' is then actuated such that the drive rod 20' is pulled in, the pulling elements 16' are also pulled in and the segment unit 11 contracted. In this case, its segments 15' and 14' and also the cover segment 23 as well as the fixing device 12' of the teat cup 4 come into contact and interlock by way of their guide portions and corresponding receiving means. The teat cup 4, in this case, is pulled up out of the park position and is held in an almost perpendicular position in the positioning position. When the cover segment 23 engages with the other segments in this manner, the cover 24, which is fixedly connected to the cover segment 23, is pivoted away from the teat cup 4 and its head 5 with the teat opening is free.

Through the defined axial movement possibility of the cover segment 23 compared to the entrainment means 26, the cover segment 23 can be moved with its guide portion 23c into the conical receiving means 14'c of the adjacent intermediate segment 14' by means of the pulling elements 16', which is illustrated in FIG. 12.

During the positioning operation of the teat cups 4 onto the teats of an udder of an animal to be milked, at the start of moving the milking cluster 2 up perpendicularly in the direction of the udder, the teat cups 4 which are not positioned are released from their positioning position and are consequently left in the park position. Only the teat cup 4 which is to be positioned remains fixed (by the retracted drive device 19' 20') and consequently in the positioning position. The advantage of this is that teat cups that are not to be positioned do not press into the udder (if several teat cups 4 are in the positioning position, as is shown in FIG. 7, and are upright, this is unpleasant for the animal to be milked, and as a result it is more fidgety, which can also lead to residual impurities on the udder (e.g. straw) passing into the teat cups 4 that are not to be positioned). So that the released teat cups 4 do not hang down too low in the park position and consequently touch the ground, the carrying piece 25 is provided and the released intermediate segments 14', 15' rest in/on said carrying piece.

In the milking position, when the respective teat cup 4 is connected to the respective teat, the pulling elements 16' are also released by the drive devices 19'. As a result, a lateral freedom of movement for approaching and positioning is made possible for the other teat cups 4.

Figure 13:
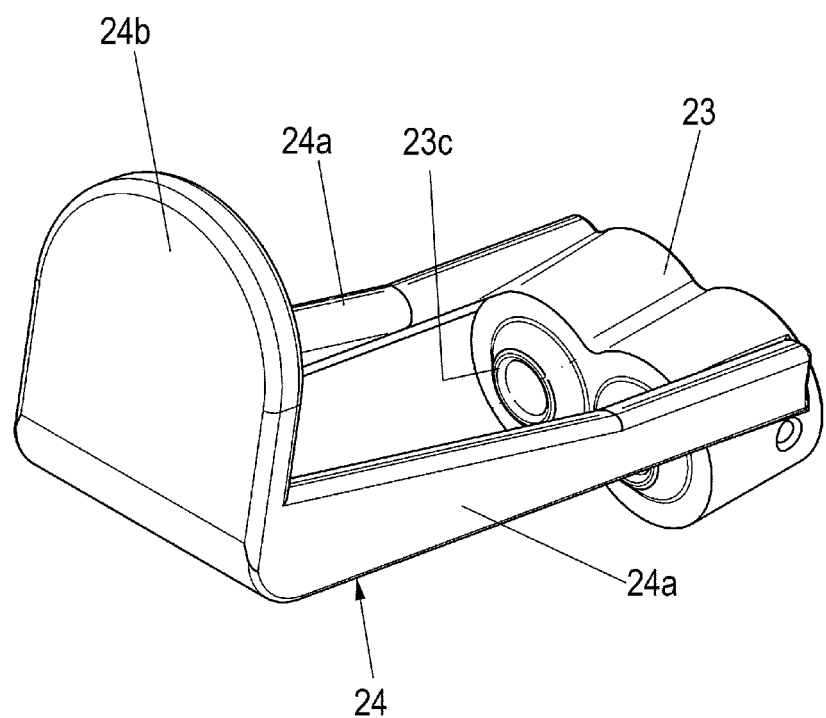
FIG. 13 shows a schematic perspective view of a cover segment of the second exemplary embodiment according to FIG. 7.

FIG. 13 shows a schematic perspective view of the cover segment 23 of the second exemplary embodiment according to FIG. 7.

The cover segment 23, as the intermediate segments 14', consists of two cylindrical parts which rest side by side and are laterally connected. It can naturally also have other forms. In each case a pulling element 16' is guided through the inner bores, as can be seen from FIGS. 9 and 11. The inner bores are provided with circumferential guide portions 23c on one side and with corresponding receiving portions 23d (FIG. 10) on the other side.

In each case, an end of a cover arm 24a of the cover 24 is attached on the longitudinal sides of the cover segment 23 and is fixedly connected to the cover segment 23. The cover arms 24a extend parallel to one another in the longitudinal direction of the cover segment 23 and at the other ends are slightly raised upward and are connected to the cover cap 24b. The cover cap 24b points upward in FIG. 13 and is rounded off. Its size corresponds to the size or the diameter of the head 5 of the teat cup 4 that it is to cover.

A bore is shown on the side of the cover segment 23 below the fastening of the front cover arm 24a, through which bore the stop pin 27 is introduced for cooperation with the elongate holes 26a of the entrainment means 22 during assembly.

FIG. 14 shows a schematic perspective view of the second exemplary embodiment of the milking cluster 2 according to FIG. 7 in the milking parlor 1 according to FIG. 1.

The carrier 3 with the milking cluster 2 is pivotably connected by means of the fastening arm 3a to a support device (not shown in any more detail). The support arm device, automatically or actuated by a robot arm, can move the milking cluster 2 out of the position shown next to the location of the animal to be milked under the animal in order to position the teat cup units. It is possible to move the teat cup units 10' in the positioning position with the covers 24 pivoted-off in said common positioning position, e.g. together, under a cleaning unit (not shown).

FIG. 15 shows a schematic perspective view of a third exemplary embodiment of the milking cluster 2.

Unlike the second exemplary embodiment of the milking cluster 2, the third exemplary embodiment has a pulling element arrangement with a segment unit 11' without cover segments 23 and cover 24.

The fixing device 12' is in direct contact with an intermediate segment 14'.

One teat cup unit 100' is in the positioning position and the other three teat cup units 100 are in the park position. With the pulling elements 16' released (as shown in FIG. 7), the teat cup 4 is moved by means of gravitational force into the park position, some of the intermediate segments 14' remaining supported by the carrying piece 25 and some being moved downward by gravitational force on the pulling elements 16' and coming to rest on the fixing device 12' and on one another.

The coupling of the pulling elements 16' by way of their ends is effected in a simple manner, e.g. by means of tab-shaped couplings, on the teat cup 4 on the fixing device 12', as shown as an example in FIGS. 11 and 12. Said tabs, however, do not have to be realized as entrainment means with elongate holes. The important factor is a pivotable coupling of such tabs on the teat cup 4 or on the fixing device 12', e.g. by means of a pivot bolt 28.

As the teat cup units 10, 100 are actuatable individually in all the exemplary embodiments, it is obviously possible for the milking clusters 2 to be able to be used for milk-producing animals with less than four teats, e.g. three. It is equally imaginable for a larger number to be possible by means of a corresponding number of teat cup units 10, 100.

The pulling elements 16, 16' and 17 can be realized as flexible elements. They can also be chains which are connected in rows by means of force-storing elements, e.g. tension springs.

The invention claimed is:

1. A milking cluster for a milking parlor for milking milk-producing animals, the milking cluster comprising:
   a teat cup unit having a teat cup;
   a drive device; and
   a pulling element arrangement connected between the teat cup and the drive device, and the pulling element arrangement includes a segment unit defining an interior space and a plurality of pulling elements, and wherein the segment unit includes a first segment, an intermediate segment, and a fixing segment, and at least two of the pulling elements are arranged at least partially within the interior space of the segment unit.

2. The milking cluster of claim 1, wherein the teat cup unit is movable between a park position in which the teat cup assumes a position that is inclined with respect to vertical, a positioning position in which the teat cup is in a substantially vertical position, and a milking position in which the teat cup is connected to an associated teat of the animal to be milked.

3. The milking cluster of claim 1, wherein the segment unit comprises:
   a fixing device joined to the teat cup; and
   wherein the first segment includes a tilt segment adjacent to the fixing device; and
   the fixing segment is joined to a teat cup unit housing.

4. The milking cluster of claim 3, wherein the fixing device further comprises: an inclined tilt portion, and the tilt segment has an inclined contact portion which bears against the inclined tilt portion when the teat cup unit is in a park position.

5. The milking cluster of claim 1, wherein the fixing segment is mounted to the drive device.

6. The milking cluster of claim 1, and further comprising:
   a tilt lever operatively connected between the drive device and the pulling elements; and
   a tilt drive operatively connected to the tilt lever.

7. The milking cluster of claim 6, wherein the tilt lever is movable by the drive device into a first position in which the pulling elements are tensioned, and the segment unit is contracted to engage the teat cup in a positioning position, and the tilt lever is movable by the drive device into a second position in which the at least two pulling elements are slackened, to move the teat cup into a milking position.

8. The milking cluster of claim 6, wherein the segment unit comprises:
   a fixing device joined to the teat cup and having an inclined tilt portion; and
   a tilt segment adjacent to the fixing device and having an inclined contact portion which bears against the inclined tilt portion when the teat cup unit is in a park position;
   and
   wherein:
      the fixing segment is joined to a housing;
      the tilt lever is pivotable about a tilt axis to a first position by the tilt drive and into a pivot position in which at least one of the pulling elements is shortened and another pulling element is lengthened and;
      the inclined tilt portion of the fixing device and the inclined contact portion of the tilt segment are engaged and the teat cup is pivoted into a park position which is inclined with respect to perpendicular.

9. The milking cluster of claim 1, wherein the teat cup unit is movable between a park position, a positioning position, and a milking position in which the teat cup is connected to an associated teat of the animal to be milked.

10. The milking cluster of claim 1, and further comprising:
    a fixing device fixed to the teat cup; and
    wherein the first segment includes a cover segment; and
    the fixing segment is fixed to a housing.

11. The milking cluster of claim 10, wherein the cover segment is joined to a cover.

12. The milking cluster of claim 1, and further comprising:
    a head defining a teat opening to the teat cup; and
    a cover cap for covering the head in a park position.

13. The milking cluster of claim 12, and further comprising:
    a cover segment defining an entrainment slot, and
    a stop pin pivotably connected to the teat cup and slidably disposed in the entrainment slot.

14. The milking cluster of claim 1, and further comprising:
    a fixing device fixed to the teat cup and wherein the fixing segment is fixed to a housing.

15. The milking cluster of claim 1, and further comprising:
    a carrier piece joined to the teat cup unit on which the intermediate segment rests.

16. The milking cluster of claim 1, wherein at least two of the pulling elements of the pulling element arrangement are arranged side by side.

17. The milking cluster of claim 1, wherein at least two of the pulling elements of the pulling element arrangement are operatively connected to the drive device.

18. The milking cluster of claim 17, wherein:
    at least two of the pulling elements are movable by the drive device into a first position in which they are tensioned, the segment unit is contracted, and the teat cup is in a positioning position; and
    the at least two pulling elements are movable by the drive device into a second position in which they are slackened and the teat cup is moved by gravitational force into a park position or a milking position.

19. A milking parlor for milking milk-producing animals, the milking parlor having a milking cluster comprising:
    a teat cup unit having a teat cup;
    a drive device; and
    a pulling element arrangement connected between the teat cup and the drive device, the pulling element arrangement includes a segment unit defining an interior space and a plurality of pulling elements, and wherein the segment unit includes a first segment, an intermediate segment, and a fixing segment, and at least two of the pulling elements are arranged and at least partially within the interior space of the segment unit.

20. The milking parlor of claim 19, wherein the milking cluster is attached to a support arm device.

21. The milking parlor of claim 20, wherein the milking cluster is attached in a flexible manner to the support arm device.

22. The milking parlor of claim 19, wherein the milking cluster is attached to a robot arm.

23. The milking parlor of claim 22, wherein the milking cluster is attached in a flexible manner to the robot arm.

* * * * *